United States Patent
Lekowicz

(10) Patent No.: US 8,746,410 B1
(45) Date of Patent: Jun. 10, 2014

(54) OUTDRIVE GEAR OIL MONITOR

(76) Inventor: Raymond P. Lekowicz, Wilmington, CA (US)

(*) Notice: Subject to any disclaimer, the term of this patent is extended or adjusted under 35 U.S.C. 154(b) by 1061 days.

(21) Appl. No.: 12/403,452

(22) Filed: Mar. 13, 2009

Related U.S. Application Data

(60) Provisional application No. 61/036,505, filed on Mar. 14, 2008.

(51) Int. Cl.
*F01M 11/12* (2006.01)

(52) U.S. Cl.
USPC ............... 184/103.1; 184/1.5; 184/6

(58) Field of Classification Search
USPC ............... 184/1.5, 6, 103.1; 123/196
See application file for complete search history.

(56) References Cited

U.S. PATENT DOCUMENTS

| | | | | | |
|---|---|---|---|---|---|
| 2,918,986 | A | * | 12/1959 | Leipert | 184/6.18 |
| 3,042,146 | A | * | 7/1962 | Shimanckas | 184/6.18 |
| 3,335,817 | A | * | 8/1967 | Horning | 184/6.21 |
| 3,603,432 | A | * | 9/1971 | Stenzel | 184/6 |
| 3,647,024 | A | * | 3/1972 | Wick et al. | 184/6.18 |
| 3,720,287 | A | * | 3/1973 | Martel | 184/1.5 |
| 4,240,523 | A | * | 12/1980 | Nestor et al. | 184/1.5 |
| 4,271,874 | A | * | 6/1981 | Brady | 141/1 |
| 4,403,578 | A | * | 9/1983 | Iwai et al. | 123/73 AD |
| 4,417,561 | A | * | 11/1983 | Yasuhara | 123/575 |
| 4,480,602 | A | * | 11/1984 | Kobayashi et al. | 123/73 AD |
| 4,572,120 | A | * | 2/1986 | Matsumoto | 123/196 S |
| 4,674,456 | A | * | 6/1987 | Merritt | 123/196 S |
| 4,764,135 | A | * | 8/1988 | McCormick | 440/83 |
| 4,869,346 | A | * | 9/1989 | Nelson | 184/1.5 |
| 4,872,531 | A | * | 10/1989 | Meisenburg et al. | 184/6.4 |
| 4,909,205 | A | * | 3/1990 | Bewley, III | 123/196 S |
| 4,921,071 | A | * | 5/1990 | Lonnborg et al. | 184/6.4 |
| 4,993,979 | A | * | 2/1991 | Bland et al. | 440/75 |
| 5,092,429 | A | * | 3/1992 | Linares et al. | 184/1.5 |
| 5,203,429 | A | * | 4/1993 | Zager | 184/1.5 |
| 5,284,223 | A | * | 2/1994 | Fisher | 184/6.4 |
| 5,353,760 | A | * | 10/1994 | Zager | 123/196 S |
| 5,370,160 | A | * | 12/1994 | Parker | 141/98 |
| 5,390,762 | A | * | 2/1995 | Nelson | 184/1.5 |
| 5,555,857 | A | * | 9/1996 | Kanno | 123/73 AD |
| 5,643,025 | A | * | 7/1997 | Suzuki | 440/75 |
| 5,669,464 | A | * | 9/1997 | Earleson | 184/1.5 |
| 5,881,688 | A | * | 3/1999 | Graham et al. | 123/73 AD |
| 5,941,745 | A | * | 8/1999 | Kanno | 440/88 R |
| 6,082,322 | A | * | 7/2000 | Graham et al. | 123/196 S |
| 6,170,505 | B1 | * | 1/2001 | Erwin | 137/1 |

(Continued)

*Primary Examiner* — William A Rivera
*Assistant Examiner* — Michael Riegelman
(74) *Attorney, Agent, or Firm* — Kenneth L Tolar

(57) ABSTRACT

An automated gear oil service system for a boat motor outdrive includes a bidirectional pump that is in selective communication with a drain reservoir, a refill reservoir and the motor's gear oil lube chamber. A control panel positioned on the boat dashboard operates the pump and associated solenoid valves allowing a user to transfer gear oil from the refill reservoir into the fluid chamber or to drain fluid from the chamber into the drain reservoir. The control panel includes LEDs in communication with a level sensor that indicates the relative gear oil level within the chamber. Accordingly, when the LEDs indicate a low fluid level, the user can easily replenish the gear oil by actuating a first button to initiate transfer of fluid from the refill reservoir to the lube chamber. To observe the quality of lubricating fluid within the chamber, the user actuates a second button to transfer the fluid from the chamber into the drain reservoir where the user can inspect the fluid for contamination.

12 Claims, 3 Drawing Sheets

(56) References Cited

U.S. PATENT DOCUMENTS

| | | | |
|---|---|---|---|
| 6,202,790 B1 * | 3/2001 | Oligmueller | 184/6 |
| 6,273,031 B1 * | 8/2001 | Verdegan et al. | 123/1 A |
| 6,478,642 B1 * | 11/2002 | Kolb et al. | 440/88 R |
| 6,541,718 B2 * | 4/2003 | Burkholder et al. | 200/50.28 |
| 6,779,633 B2 * | 8/2004 | Viken | 184/1.5 |
| 6,959,740 B2 * | 11/2005 | Few | 141/65 |
| 7,686,136 B2 * | 3/2010 | Evans | 184/1.5 |
| 7,850,496 B1 * | 12/2010 | Eichinger | 440/88 L |
| 2002/0148686 A1 * | 10/2002 | Yun et al. | 184/1.5 |

* cited by examiner

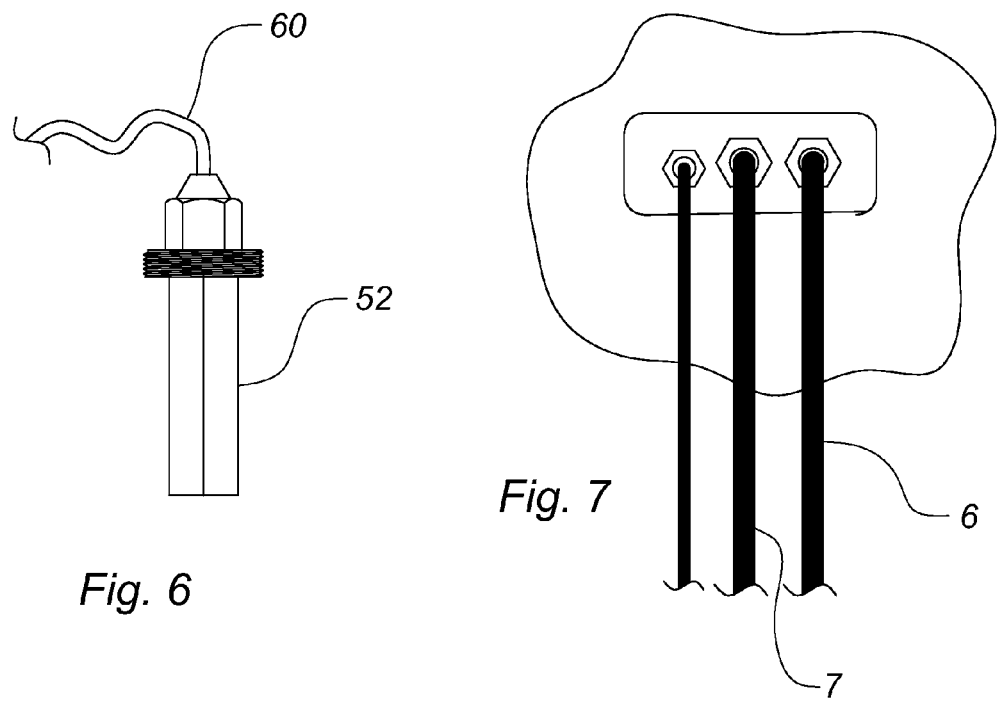
Fig. 6
Fig. 7
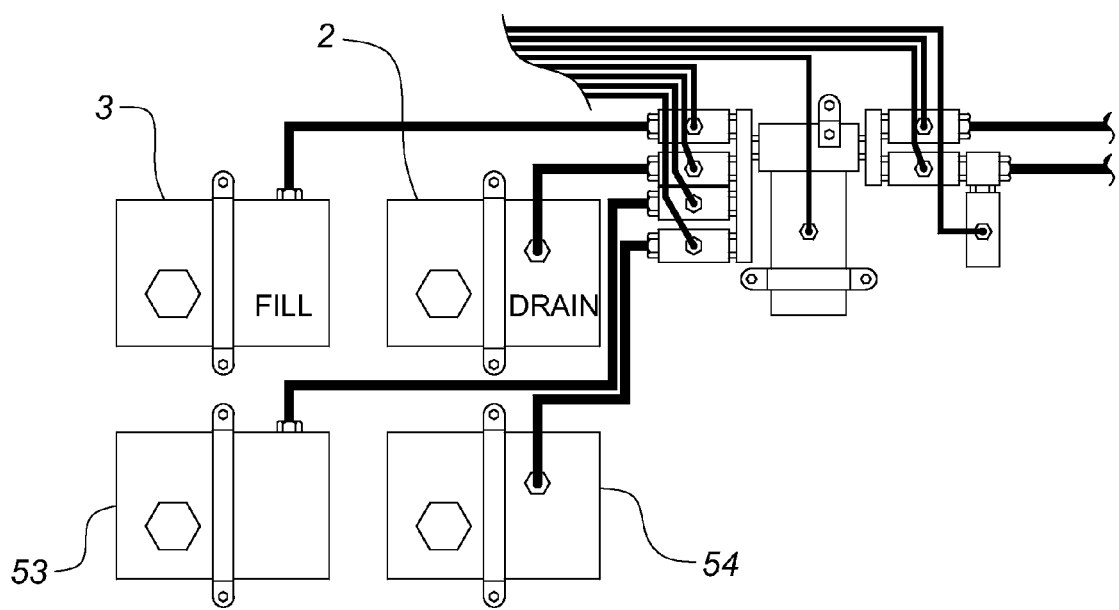
Fig. 8

OUTDRIVE GEAR OIL MONITOR

CROSS REFERENCE TO RELATED APPLICATIONS

This application is entitled to the benefit of provisional application No. 61/036,505 filed on Mar. 14, 2008, the specification of which is incorporated herein by reference.

BACKGROUND OF THE INVENTION

The present invention relates to a system for monitoring and automatically replenishing lubricating fluid in a boat motor outdrive.

DESCRIPTION OF THE PRIOR ART

A boat motor outdrive is expensive and can be easily ruined if not properly lubricated with a sufficient quantity of clean gear fluid. Because the fluid level and quality must be manually checked, routine inspection is often neglected; accordingly, a boat motor outdrive is often operated with insufficient or contaminated fluid thereby damaging the outdrive. Therefore, there is currently a need for an easier means of monitoring, inspecting and replenishing gear fluid. The present invention addresses this need by providing a monitoring system that alerts a boat operator if the fluid level is below a predetermined threshold allowing the operator to automatically replenish the fluid to an acceptable level.

SUMMARY OF THE INVENTION

The present invention relates to an automated gear oil monitoring and service system for a boat motor outdrive including a bidirectional pump that is in selective communication with a drain reservoir, a refill reservoir and the motor's gear oil lube chamber. A control panel positioned on the boat dashboard operates the pump and associated solenoid valves allowing a user to transfer gear oil from the refill reservoir into the lube chamber, or to drain fluid from the chamber into the drain reservoir. The control panel includes LEDs in communication with a sensor that measures the relative gear oil level within the lube chamber. Accordingly, the user can easily replenish the fluid within the chamber when the LEDs indicate a low fluid level. To observe the quality of gear oil within the chamber, the user depresses a drain switch that causes the pump to transfer the fluid from the chamber into the drain reservoir where the user can inspect the fluid for contamination.

It is therefore an object of the present invention to provide a gear oil service system for a boat motor outdrive that allows a boat motor operator to automatically replenish gear oil fluid.

It is another object of the present invention to provide a gear oil service system for a boat motor outdrive that allows a boat operator to readily verify the quality and quantity of gear oil fluid.

Other objects, features, and advantages of the present invention will become readily apparent from the following detailed description of the preferred embodiment when considered with the attached drawings and the appended claims.

BRIEF DESCRIPTION OF THE DRAWINGS

FIG. 6 depicts the gear oil level sensor.

FIG. 7 is a plan view of the fluid transfer lines and level sensor electrical cord.

FIG. 8 depicts the fluid transfer system according to a second embodiment of the present invention.

DESCRIPTION OF THE PREFERRED EMBODIMENT

Figure 1:
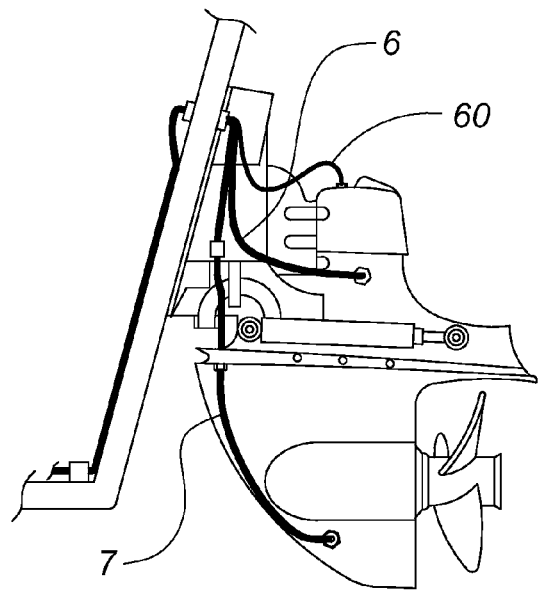
FIG. 1 depicts the various fluid transfer lines connected to a boat motor outdrive.
Figure 2:
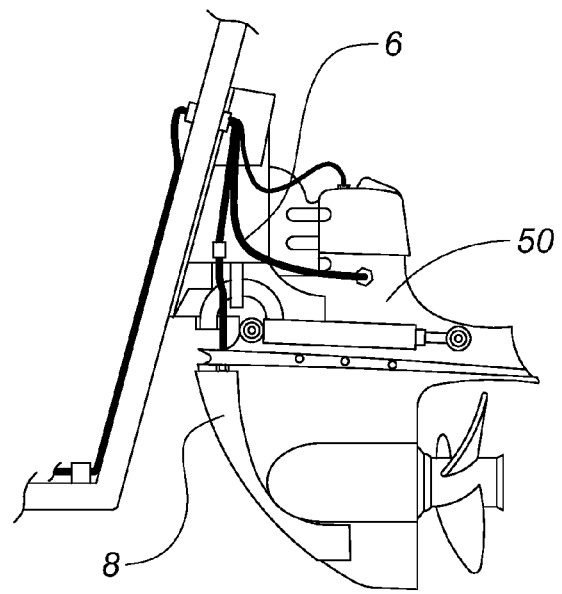
FIG. 2 depicts the outdrive of FIG. 1 with the fairing secured over the drain line.
Figure 3:
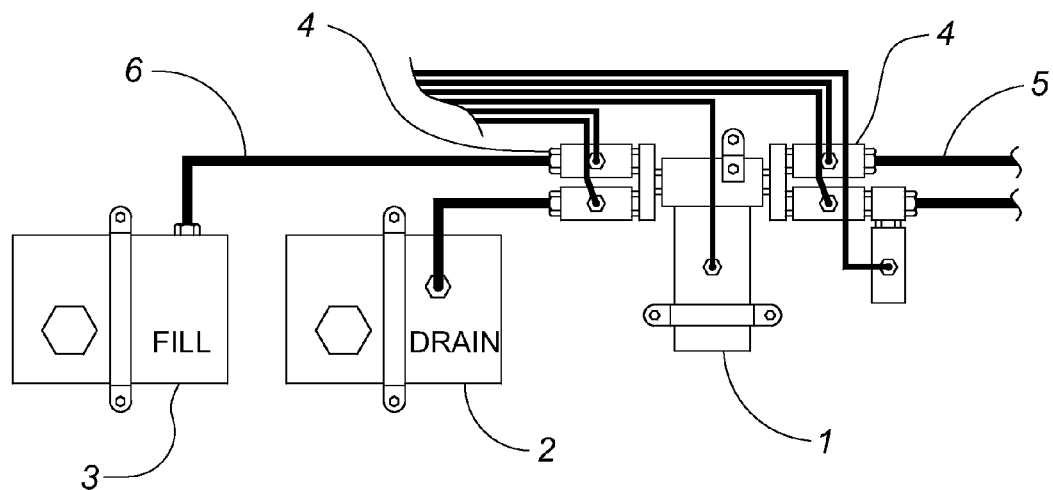
FIG. 3 depicts the fluid transfer system according to the present invention.
Figures 4, 5:
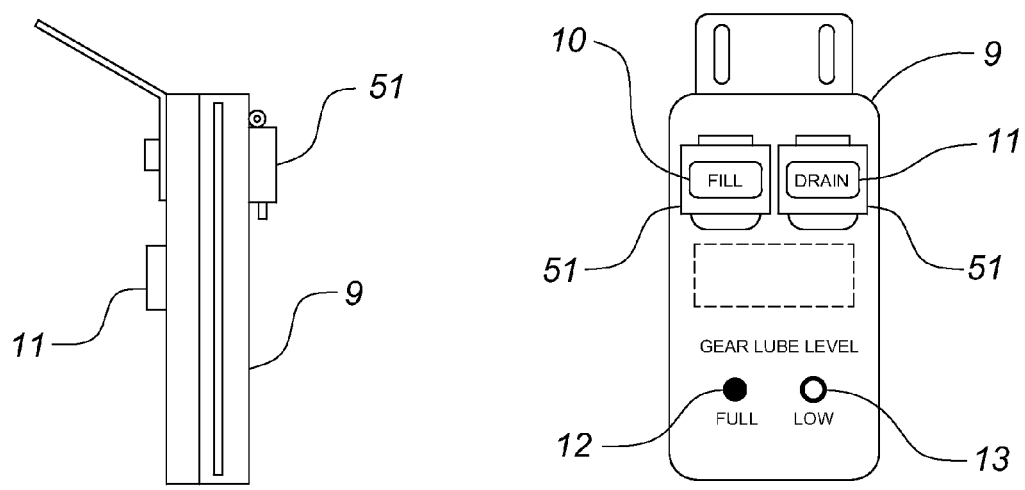
FIG. 4 is a plan view of the control box.
FIG. 5 is a side view of the control box.

The present invention relates to an automated lubricating system for a boat motor outdrive. The system comprises a bidirectional, DC-powered pump 1 conveniently positioned on the boat. The pump is in select fluid communication with a drain reservoir 2 and refill reservoir 3 using a system of solenoid valves 4 and stainless steel tubing 5. A refill line 6 extends from the refill chamber and pump to the upper portion of the outdrive gear-lube chamber 50. A drain line 7 extends from a lower portion of the gear lube chamber to the pump and the drain reservoir. Because a portion of the drain line may be submerged during boat operation, it may be covered with a stainless steel fairing 8 to minimize drag.

The pump and solenoid valves are operated with a control panel 9 conveniently positioned on the boat dashboard. The control panel includes a fill button 10 and a drain button 11 for either transferring fluid into or out of the lube chamber. The buttons are sealed to minimize moisture intrusion and include transparent, pivotal covers 51 to prevent inadvertent operation.

Adjacent the fill and drain buttons are a pair of fluid level indication LEDs which are electrically connected (via cord 60) to a fluid sensor 52 positioned within an upper portion of the outdrive lube chamber. A first LED 12 is illuminated (preferably green) to indicate that a proper level of fluid is contained within the lube chamber. A second LED 13 is illuminated (preferably red) when the sensor detects a gear oil level below a predetermined threshold. The control panel further includes a microprocessor that controls the various above-described functions.

Accordingly, if the low level LED is illuminated, the boat operator simply depresses the fill button 10 on the control panel. The pump is activated and delivers fresh, clean fluid from the refill chamber to the outdrive lube chamber. When the first LED is illuminated indicating a proper level of fluid in the chamber, the operator releases the fill button to deactivate the pump. To examine the fluid quality, the user depresses the drain button causing the pump and solenoid valves to transfer fluid from the fluid chamber to the drain reservoir. The operator then removes a lid from the drain reservoir to determine the presence of water or other contamination that typically enters through leaking seals, indicating that the outdrive requires service. Alternatively, the drain reservoir may be transparent allowing the user to readily observe the contents without removing the lid.

Now referring specifically to FIG. 8, the device may also include an antifreeze reservoir 53 and a rinse fluid reservoir 54 in addition to the fill and drain reservoirs. Additional fluid transfer lines, solenoid valves, buttons and wiring for the control box would be necessary to allow a user to drain the lubricating fluid, flush the lube chamber and refill the chamber with antifreeze to store the motor during winter months.

The above-described device is not limited to the exact details of construction and enumeration of parts provided herein. Furthermore, the size, shape and materials of construction can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An automated lubricating system for a boat motor outdrive having a gear-lube chamber comprising:
    a lubricating fluid reservoir;
    a sensing means for monitoring a level of lubricating fluid within said gear-lube chamber;
    means for transferring lubricating fluid from said fluid reservoir to said gear-lube chamber upon said sensing means detecting a level within said gear-lube chamber that is below a predetermined threshold.

2. The automated lubricating system according to claim 1 further comprising:
    a drain reservoir having an interior that is readily viewable by a boat operator;
    means for transferring fluid from said gear-lube chamber to said drain reservoir allowing a boat operator to visually inspect said fluid.

3. The automated lubricating system according to claim 2 wherein said means for transferring lubricating fluid from said fluid reservoir to said gear-lube chamber comprises:
    a bidirectional pump in select fluid communication with said refill reservoir and said gear-lube chamber;
    a first button that instructs said pump to transfer fluid in a first direction to deliver fluid from said fluid reservoir to said gear-lube chamber.

4. The automated lubricating system according to claim 3 wherein said means for transferring fluid from said gear-lube chamber to said drain reservoir comprises:
    said pump in select fluid communication with said drain reservoir and said gear-lube chamber;
    a second button that instructs said pump to transfer fluid in a second direction to deliver fluid from said gear-lube chamber to said drain reservoir.

5. The automated lubricating system according to claim 4 further comprising a transparent cover pivotal over said first button and said second button to prevent inadvertent operation thereof.

6. The automated lubricating system according to claim 2 further comprising:
    means for delivering rinse fluid to said gear-lube chamber;
    means for delivering antifreeze to said gear-lube chamber when said gear-lube chamber is empty allowing a user to winterize said outdrive.

7. The automated lubricating system according to claim 2 further comprising means for transferring fluid from said drain reservoir to said gear-lube chamber.

8. The automated lubricating system according to claim 1 wherein said sensing means comprises:
    a level sensor positioned within said gear-lube chamber;
    a first light means in communication with said sensor for visually alerting a user when said sensor detects fluid level below the predetermined threshold;
    a second light means in communication with said sensor for visually alerting a user when said sensor detects a fluid level above a second predetermined threshold.

9. In combination with a boat motor outdrive having a gear-lube chamber, an automated lubricating system comprising:
    a lubricating fluid reservoir;
    a sensing means for monitoring a level of lubricating fluid within said gear-lube chamber;
    means for transferring lubricating fluid from said fluid reservoir to said gear-lube chamber upon said sensing means detecting a level within said gear-lube chamber that is below a predetermined threshold.

10. The automated lubricating system according to claim 9 further comprising:
    a drain reservoir;
    means for transferring fluid from said gear-lube chamber to said drain reservoir allowing a boat operator to visually inspect said fluid.

11. The automated lubricating system according to claim 10 wherein said sensing means comprises:
    a level sensor positioned within said gear-lube chamber;
    a first light means in communication with said sensor for visually alerting a user when said sensor detects fluid level below the predetermined threshold;
    a second light means in communication with said sensor for visually alerting a user when said sensor detects a fluid level above a second predetermined threshold.

12. The automated lubricating system according to claim 10 wherein said drain reservoir is transparent.

* * * * *